United States Patent [19]
Stevenson

[11] Patent Number: 5,131,805
[45] Date of Patent: Jul. 21, 1992

[54] DUAL AXIS FLUID CURRENT MOTOR

[76] Inventor: Lester A. Stevenson, R.R. 1, Box 138, Hereford, Tex. 79045

[21] Appl. No.: 688,655

[22] Filed: Apr. 19, 1991

[51] Int. Cl.⁵ .............................................. F01D 23/00
[52] U.S. Cl. ......................................... 415/1; 415/2.1; 415/4.1; 415/4.2; 415/905; 415/907; 416/132 A; 416/132 B; 416/119; 416/126; 416/123; 416/DIG.4
[58] Field of Search .......... 415/1, 2.1, 4.1, 4.2, 415/4.4, 905, 907; 416/132 A, 132 B, 134 R, DIG. 4, 119, 126, 123

[56] References Cited

U.S. PATENT DOCUMENTS

| | | | |
|---|---|---|---|
| 535,504 | 3/1895 | Milliken | 416/81 |
| 561,074 | 5/1896 | Ford | 416/119 |
| 763,795 | 6/1904 | Ravelli | 415/2.1 X |
| 928,097 | 6/1909 | Barker | 416/119 |
| 1,265,137 | 5/1918 | Tayloe | 416/110 |
| 3,995,170 | 11/1976 | Graybill | 416/132 B X |
| 4,278,894 | 7/1981 | Ciman | 416/108 X |
| 4,303,835 | 12/1981 | Bair | 416/119 X |
| 4,388,041 | 6/1983 | Dorr | 416/119 |
| 4,457,669 | 7/1984 | Corry | 416/119 |
| 4,545,729 | 10/1985 | Storm | 416/119 X |
| 4,619,585 | 10/1986 | Storm | 416/119 X |
| 4,678,394 | 7/1987 | Willoughby | 416/119 X |
| 4,684,817 | 8/1987 | Goldwater | 416/119 X |
| 4,730,119 | 3/1988 | Biscomb | 416/117 X |
| 4,789,297 | 12/1988 | Mrasek | 415/4.2 |

FOREIGN PATENT DOCUMENTS

| | | | |
|---|---|---|---|
| 1535 | 3/1898 | Denmark | 416/119 |
| 44972 | 12/1978 | Japan | 416/119 |
| 8602793 | 6/1988 | Netherlands | 415/4.1 |
| 297803 | 8/1929 | United Kingdom | 416/119 |
| 8000991 | 5/1980 | World Int. Prop. O. | 416/119 |

Primary Examiner—Edward K. Look
Assistant Examiner—Todd Mattingly
Attorney, Agent, or Firm—Wendell Coffee; Tracy W. Druce

[57] ABSTRACT

Apparatus and method for harnessing fluid energy from a fluid current and converting it into mechanical energy. The invention comprises a big wheel and a little wheel where the little wheel rotates about on axis parallel to but offset from an axis about which the big wheel rotates. The little wheel rotates within the big wheel. Flexible sails are fastened between masts of the big wheel and masts of the little wheel so that when the wheels rotate each sail is unfurled and extended during one phase of operation and said sail is folded upon itself during another phase of operation. When extended or stretched open, the sail derives power from the fluid current. When the sail is folded, it offers a reduced resistance to the fluid current into which said sail is moving.

15 Claims, 2 Drawing Sheets

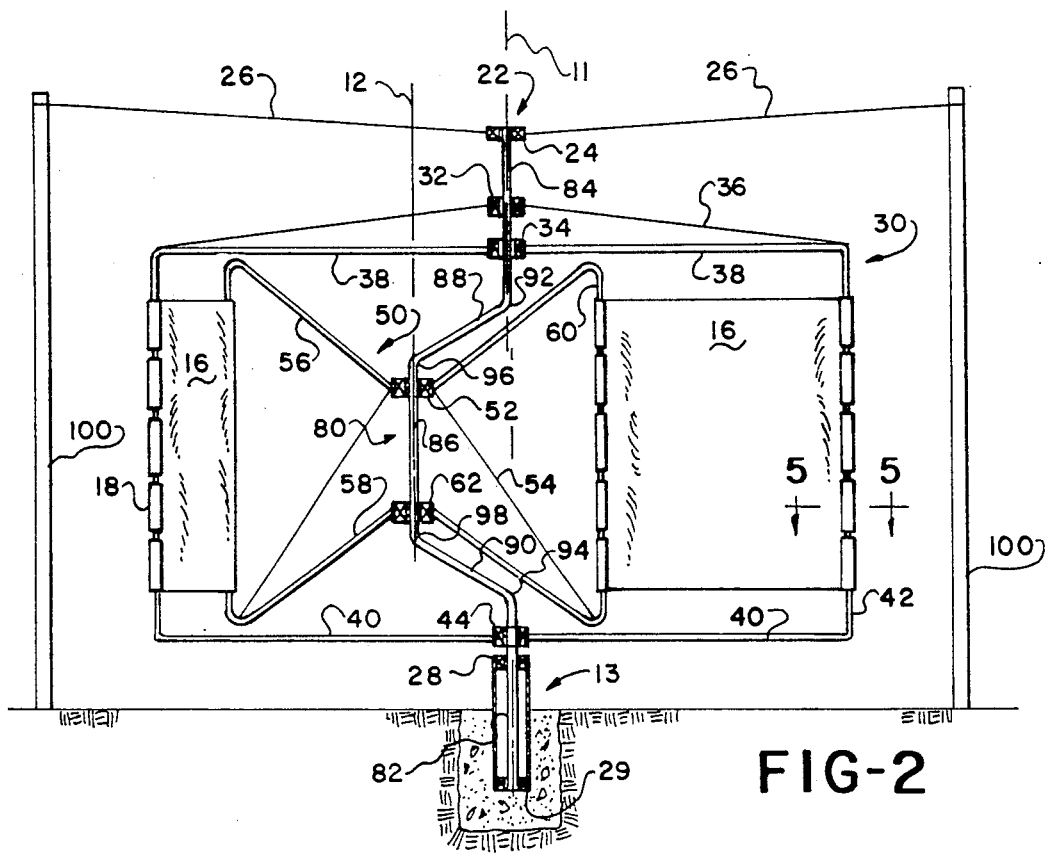
FIG-2
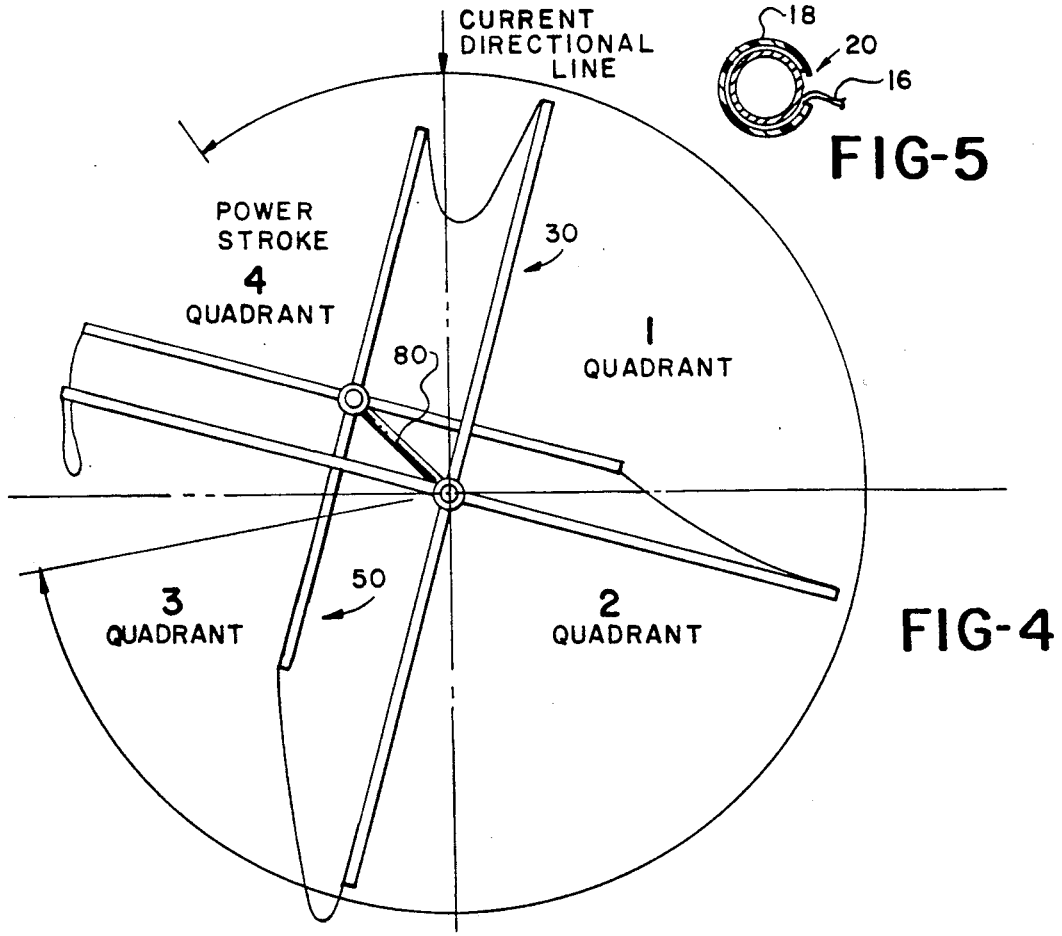
FIG-5
FIG-4

DUAL AXIS FLUID CURRENT MOTOR

BACKGROUND OF THE INVENTION

(1) Field of the Invention

This invention relates generally to fluid current motors that convert fluid energy into mechanical energy. More specifically, this invention pertains to devices that convert fluid energy from naturally occurring winds or water currents into mechanical energy. The embodiment described and shown herein is used as a windmill. Those skilled in the art are users of fluid current motors.

(2) Description of the Related Art

Fluid energy conversion devices have been in existence for many years. Although fluid energy may be embodied within either gas or liquid, there are many more devices designed to capture fluid energy from air movement or wind. There are several inherent problems encountered in the conversion of wind energy into mechanical energy due to the nature of naturally occurring winds. The primary problem is that winds are rarely constant with respect to either velocity or direction. For that reason a conversion device can seldom be counted on for a continuous supply of energy. In many locales, wind velocity is considerably variable and devices that are not capable of operating below a certain threshold wind speed are inoperative when there are light winds. Conversely, high velocity winds may cause damage to the motor or cause it to operate at dangerous speeds.

Known patented devices intended to capture the wind's energy include:

| | | |
|---|---|---|
| 4,730,119 | BISCOMB | 1988 |
| 4,684,817 | GOLDWATER | 1987 |
| 4,678,394 | WILLOUGHBY | 1987 |
| 4,619,585 | STORM | 1986 |
| 4,545,729 | STORM | 1985 |
| 4,457,669 | CORRY | 1984 |
| 4,388,041 | DORR | 1983 |
| 4,303,835 | BAIR | 1981 |
| 4,278,894 | CIMAN | 1981 |
| 3,995,170 | GRAYBILL | 1976 |
| 1,265,137 | TAYLOE | 1918 |
| 928,097 | BARKER | 1909 |
| 535,504 | MILLIKEN | 1895. |

MILLIKEN discloses a windmill that is described as a useful improvement in automatic regulators for windmills. The object of the invention is to provide a cheap and stable means of utilizing the force of the wind.

BARKER discloses a windmill that has several sails which are mechanically oriented so as to derive power from the wind on a power stroke and to be positioned parallel to the wind when opposing said wind.

TAYLOE discloses a device that derives power with paddle type structures that rotate about a horizontal axis.

CIMAN discloses a wind driven power generator that comprises a plurality of blades mounted between a pair of spoked wheels on a vertical column. The blades are oriented by a vane that detects the direction of the wind so that at least one blade on the vertical column is perpendicular to the direction of the wind and the other blade or blades are parallel to said wind direction.

BAIR discloses a wind powered generator with cyclic airfoil latching. Airfoils are latched and unlatched during different phases of a rotation so that during one phase they are latched and perpendicular to the wind thereby deriving power from said wind, while in another phase they are unlatched and swing parallel to the direction of the wind so that they cause little resistance against said wind. The latching and unlatching cycle of the airfoil is determined by the wind direction and is effected by electronic means which determine the point of latching and unlatching as a function of the wind direction.

DORR discloses a rotating sail fluid current motor. The device includes one or more flexible rectangular sails mounted on a supporting frame having sail guides and drive apparatus that effect a cyclical folding and unfolding of each sail so as to make the sail resistant to the wind's current in one phase and not resistant in another.

COREY discloses a jibe mill which incorporates sails mounted on a frame. Each sail is made of flexible material and may be rolled or reefed with a spring biased weight so as to either increase or decrease the area of each sail. In another embodiment of the COREY device, the sails are made of metal and speed control is provided by hydraulic cylinders that pivot each sail.

STORM '729 discloses a wind turbine apparatus that has a plurality of sail elements secured to a circular frame. The sails are extended and retracted with weighted cables that react to wind velocity.

STORM '585 discloses an improvement over '729 in that the sail elements include deformable outer skin portions and an interior rigid form against which the sails may press. During operation, the skin portion most directly opposing the wind is pressed against the rigid interior form and the other skin portion behind the rigid form is allowed to extend away from said form. This configuration during operation gives the sail a more winglike shape thereby changing the camber of the sail element.

WILLOUGHBY discloses a fluid current driven machine employing individually self-governing energy panels. Each of the panels is journalled to a frame on bearings so that in calm winds the panel hangs vertically and presents a planar face perpendicular to the direction of wind. As the wind speed increases and the rotation of the frame increases beyond an optimum speed the panels rotate on the bearings so that they become more horizontally oriented until their planar faces are parallel to the direction of the wind offering little resistance. Additionally, the frame rotates about a horizontal axis and the device is operated within a box about its lower portion so that the panels below the horizontal axis are blocked from said wind thereby preventing them from causing resistance to said wind.

GOLDWATER discloses a valvular sail power plant which includes radially oriented sail vanes upon which there are a plurality of panels that are journalled to each vane. During one phase of operation the individual panels are closed so that their planar faces are parallel to a long axis of the vane. In this configuration the vane provides resistance to the wind and derives power. In another phase, the individual panels are allowed to swing open so that when the vane is perpendicular to the wind direction each panel's planar face is parallel to the direction of wind thereby offering little resistance to said wind. The panels are biased with springs and cords to assist in their opening and closing during operation.

BISCOMB discloses a sail driven wind motor having one or two arms that extend radially with a conventional fore-and-aft rigged sail at the distal end of each arm. There are three different designs depending upon the sites of operation; one is for land, one is for shallow water, and the other is for deep water.

Lastly, GRAYBILL discloses a wind energy conversion device that includes upright posts mounted on a framework with sails connected at said sail's midsection to the posts. The shape of each sail is governed by cords connected between the frame and outside edges of each sail. During one phase of operation the sail opens and provides resistance to the wind thereby deriving power from said wind. In another phase the sail is allowed to fold upon itself so as to provide little resistance to the wind during said sail's return cycle into the wind on the circular framework.

A common feature of many of the above described devices is that their operation is rotational either about a vertical or horizontal axis. Because of this, it is required that the device have elements that are resistant to the wind during one phase thereby deriving power from said wind and driving the motor during a power stroke. Additionally, these same elements must return against the wind to be readied for another power stroke. When returning, the elements must offer a reduced resistance to the wind so that they do not counteract the power stroke of the opposing phase of operation.

None of the disclosed devices incorporate two wheels with one being smaller than the other and the smaller being located within the larger wheel. Nor do any of the disclosed devices show two wheels, each rotating independently of the other without mechanical restraint about parallel offset axes and with only a sail element connected directly between the wheels. Furthermore, many of the disclosed devices require sophisticated mechanical systems to control the operation of the device.

SUMMARY OF THE INvENTION:

(1) Progressive Contribution to the Art

This invention has many benefits associated with its use, several are improvements over the prior art previously disclosed. One benefit is that the motor may be operated in areas where low velocity winds are common and also in places where there is a high degree of variability in the velocity of the prevailing winds. Because the surface area presented by the sails to the wind can exceed four feet by six feet, a relatively low velocity wind is sufficient to exert a force upon the sail strong enough to rotate and consequently operate the motor.

Another benefit of the motor is that it operates at relatively low rotational speeds compared to other windmills and harnesses a high degree of power from said wind. By having slower rotational speeds, the invention experiences less wear and tear on its various moving parts thereby increasing the machine's longevity.

By moving the masts of the motor closer together and folding the sail upon itself, said sail presents little resistance to the wind into which said sail is moving when returning for another power stroke. Folding the sail does not require elaborate mechanical mechanisms like those used in several of the aforedescribed devices in which a sail type element must be mechanically manipulated to move the element from a position that offers resistance to the wind current to a position that is less resistant and more cutting to the wind.

Furthermore, this invention is self-disabling in that the sails will slip from the motor in excessively high velocity currents. This is accomplished simply by adjusting the degree of friction applied by a fastener clamping the sail to the motor. The benefit of having this self-disabling feature is that no mechanical releases are required, and it is not necessary for the motor to be attended in order to prevent damage in the event that high winds do occur.

While no elaborate mechanical systems are required for the disabling function or the orientation of each sail, there is also an absence of complicated mechanical systems associated with the basic rotational operation of the motor. Each wheel of the invention rotates freely about its respective axis with the only impedance to said rotation being friction within the hub and the forces exerted upon said wheel by the sails.

Like a conventional windmill, this invention is easily oriented for optimum recovery of energy from a wind current. This orientation is accomplished by fixing a vane to the motor so that the direction of the wind is continually tracked and the device oriented based upon the detected direction.

The design of the dual axis fluid current motor makes it readily adaptable for use in wind currents at larger scale sizes and liquid currents, such as flowing streams and tidal movements, in smaller scale sizes. The reason for the difference in scale is the viscosity of air versus the viscosity of water. Larger sails would provide too great a resistance to the more viscous water and create forces on said sail sufficient to overcome the friction of the fasteners by which the sails are fixed to the wheels. By decreasing the scale and therefore the size of each sail, less resistance is provided to the fluid current and the device is allowed to operate as designed within a water current.

The invention is constructed from components that are readily available on the retail market. A primary portion of the motor is constructed from tubular piping and standard thrust bearings.

In summation, the primary benefit of this invention is its simplicity. The opening and closure of each sail is accomplished by rotating two wheels about dual offset axes. During one phase of operation the sail is open and resistant to the wind and during an opposing phase the sail is folded over itself thereby presenting a much reduced resistance to the wind current. Furthermore, this invention lacks complicated mechanical systems that many other fluid current motors require for their operation.

(2) Objects of this Invention

An object of this invention is to provide a fluid current motor that operates in low velocity currents and is self-disabling in damagingly high currents.

Another object of this invention is to provide a fluid current motor that has few mechanical connections between its moving parts thereby more efficiently converting fluid energy into mechanical energy.

Further objects are to achieve the above with devices that are sturdy, durable, simple, safe, efficient, versatile, ecologically compatible, energy conserving, and reliable, yet inexpensive and easy to manufacture, operate, and maintain.

Other objects are to achieve the above with methods that are rapid, versatile, ecologically compatible, efficient, and do not require highly skilled people for implementation.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 2 is an elevational view of the fluid current motor.

FIG. 4 is a diagram of a top plan view of the fluid current motor showing the direction of the wind and the various phases of operation of the fluid current motor.

FIG. 5 is a cross-sectional view of the fastener clamping a sail to a mast.

Figure 1:
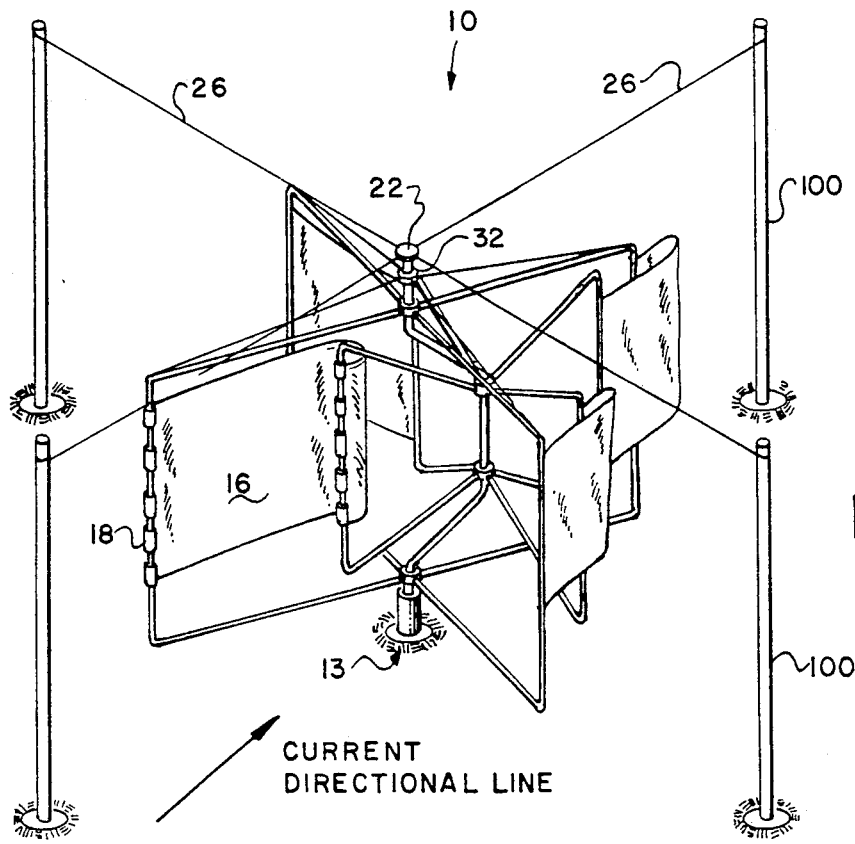
FIG. 1 is a perspective view of the fluid current motor.

As an aid to correlating the terms of the claims to the exemplary drawings, the following catalog of elements is provided:

| | |
|---|---|
| 10 | fluid current motor |
| 11 | major axis |
| 12 | minor axis |
| 13 | base |
| 14 | offset line |
| 15 | current directional line |
| 16 | sail |
| 18 | sail fastener |
| 20 | split |
| 22 | top anchor |
| 24 | top bearing |
| 26 | anchor line |
| 28 | bottom bearing |
| 29 | base bearing |
| 30 | big wheel |
| 32 | big support ring |
| 34 | big top hub |
| 36 | big support line |
| 38 | big upper spoke |
| 40 | big lower spoke |
| 42 | big mast |
| 44 | big bottom hub |
| 46 | big circle |
| 50 | little wheel |
| 52 | little top hub |
| 54 | little support line |
| 56 | little upper spoke |
| 58 | little lower spoke |
| 60 | little mast |
| 62 | little bottom hub |
| 64 | little circle |
| 80 | crank |
| 82 | bottom end |
| 84 | top end |
| 86 | mid-section |
| 88 | top extension |
| 90 | bottom extension |
| 92 | top bend |
| 94 | bottom bend |
| 96 | second bend |
| 98 | third bend |
| 100 | stationary object |

DESCRIPTION OF THE PREFERRED EMBODIMENTS

In compliance with the constitutional purpose of the Patent Laws "to promote the progress of science and useful arts" (Article 1, Section 8), Applicant submits the following disclosure of the invention.

Referring to the accompanying drawings, a fluid current motor 10 may be seen. It should be understood that the motor 10 is intended to be operable in both liquid and gaseous fluid currents, but hereinafter an embodiment appropriate for operation in a gas current, or wind is described.

The motor 10 is fixed to a base 13. In the preferred embodiment, the base 13 is constructed from round tubular steel and is fixed in the ground so that said base 13 projects upright from the ground's surface. The inner diameter of the base 13 is sufficiently large to allow a bottom end 82 of a crank 80 to be positioned therein. The crank 80 is rotatably connected to the base 13 by bottom bearing 28 located nearer a top end of the base 13 and a base bearing 29 located nearer a bottom end of said base 13. Each bearing 28 and 29 is a thrust bearing and together said bearings 28 and 29 hold the crank 80 within the base. A long axis of the base 13 and a long axis of the bottom end 82 is coincident with a major axis 11. It is contemplated that the axes may be oriented in any direction but it is preferred that they be vertical and upright.

At a top end of the bottom end 82 the crank 80 has a bottom bend 94 that connects bottom extension 90 to the bottom end 82. In the embodiment shown, a long axis of the extension 90 projects upward and away from the bottom end 82 of the crank 80 at an angle of about 25 degrees above horizontal. Mid-section 86 of the crank 80 is connected to the bottom extension 90 by third bend 98. The third bend 98 positions a long axis of the mid-section 86 coincidentally with a minor axis 12 and parallel to the major axis 11. In the preferred embodiment, the mid-section 86 is upright and connected to top extension 88 by second bend 96. The top extension 88 extends between the major axis 11 and the minor axis 12 where said extension 88 is connected to a top end 84 of the crank 80 by top bend 92. A long axis of the top extension 88 is positioned at an angle above horizontal of similar measure to that angle with horizontal at which a long axis of the bottom extension 90 in the embodiment shown. Like the long axis of the bottom end 82, a long axis of the top end 84 is coincident with the major axis 11.

The crank 80 is welded into the above described configuration from tubular steel with the preferred embodiment of said crank 80 having a round cross-sectional shape. Additionally, the crank 80 is symmetrical about a mid-point of the mid-section 86. That is, the preferred embodiment of the crank 80 is symmetrical about a horizontal line intersecting a longitudinal midpoint of the mid-section 86.

The top end 84 is rotatingly connected to top anchor 22 by top bearing 24 which is oriented concentrically about the major axis 11. The top anchor 22 is stabilized by anchor lines 26 that are each fixed at distal ends to a stationary object 100. In the embodiment illustrated, the stationary objects 100 are telephone type poles located about the motor 10. The anchor lines 26 are oriented radially from the top anchor 22 and tension is applied thereto. In this manner, stability in directions perpendicular to the major axis 11 is provided to the top end 84 of the crank 80.

Big wheel 30 is rotatably connected about the major axis 11 by big top hub 34 and big bottom hub 44. Both hubs 34 and 44 are bearings that limit motion of the big wheel 30 in directions perpendicular to the major axis 11 about which said hubs are concentrically oriented. The top hub 34 is connected about the top end 84 of the crank 80 while the bottom hub 44 is connected about the bottom end 82.

Big upper spokes 38 project radially from the big top hub 34. In the preferred embodiment, a long axis of each upper spoke 38 is perpendicular to the majo axis 11. Big lower spokes 40 extend from the big bottom hub 44 in a similar fashion as do the upper spokes 38 from the big top hub 34. That is, each lower spoke 40 projects radially from the hub 44 and a long axis of each of said spokes 40 is perpendicular to the major axis 11.

There are at least two upper spokes 38 and at least two lower spokes 40 and the number of lower spokes 40 equals the number of upper spokes 38 on each motor 10. The spokes 38 and 40 are oriented so that each upper spoke 38 has a lower spoke 40 directly below said upper spoke 38. Regardless of the number of spokes 38 and 40, the spokes on each hub 34 and 44 are equiangularly spaced about the major axis in the preferred embodiment.

A big mast 42 is connected between each upper spoke 38 and a corresponding lower spoke 40 beneath said upper spoke 38. The preferred configuration is to have one mast 42 connected at a distal end of each upper spoke 38 at a top end of said mast 42 and likewise connected to a lower spoke 40 at a bottom end of said mast 42. A long axis of each mast 42 is oriented so that it is parallel to the major axis 11 and each is an equal distance from said major axis.

It is contemplated that a ring may be fastened to the upper spokes 38 with said ring concentric about the major axis. Likewise, another ring may be fastened to the lower spokes 40 with that ring also concentric about the major axis. Masts 42 may then be connected between said rings or an equivalent at positions other than directly between the spokes 38 and 40.

A majority of the weight of the big wheel 30 is suspended upon big support lines 36 which are connected between big support ring 32 and the big wheel 30 at points near the distal ends of the upper spokes 38. The support ring 32 is rotatably connected to the top end 84 of the crank 80 and is concentric about the major axis 11. Each support line 36 is maintained under tension and oriented radially about the major axis 11.

Little wheel 50 is rotatably connected about the mid-section 86 of the crank 80 and therefore the minor axis 12 in a manner similar to that used to rotatably connect the big wheel 30 about the major axis 11. Little top hub 52 is concentric about the minor axis 12 and rotatably connected to a top end of the mid-section 86. A little bottom hub 62 is similarly connected to a lower end of the mid-section 86. Little upper spokes 56 extend radially from the top hub 52 Unlike the illustrated embodiment of the big wheel, however, the little spokes 56 do not extend perpendicularly away from the minor axis 12. The upper spokes 56 extend from the top hub 52 in a direction toward the upper spokes 38 of the big wheel 30. Little lower spokes 58 are radially connected to the bottom hub 62 so that each spoke 58 extends radially from the bottom hub 62 in a direction toward lower spokes 40 of the big wheel 30.

Like the big wheel 30, it is preferred that the little wheel 50 have at least two upper spokes 56 and two lower spokes 58 with little masts 60 connected one each between pairs of vertically aligned spokes 56 and 58.

A long axis of each little mast 60 is parallel to the axes 11 and 12. A horizontal plane intersecting mid-points of each big mast 42 also intersects mid-points of each little mast 60 as shown.

Little support lines 54 function similarly to support lines 36 by supporting a majority of the weight of the little wheel 50. The lines 54 are connected between an upper portion of the wheel 50 at or near the top hub 52 and a lower portion of said wheel 50 at or near distal ends of the lower spokes 58.

When the big wheel 30 and the little wheel 50 are rotated about their respective axes, cylindrical volumes are defined by each of the wheel's 30 and 50 extremities as said wheels 30 and 50 rotate. In the preferred embodiment, the round sides of the cylinders are defined by the rotating masts 42 and 60. When the cylinder generated by the rotating big wheel 30 is bisected by a plane oriented perpendicularly to the major axis 11, a big circle 46 having a radius and a circumference is defined by an intersection of said plane and cylinder. When the cylinder generated by the rotating little wheel 50 is bisected by a plane oriented perpendicularly to the minor axis 12, a little circle 64 having a radius and a circumference is defined by an intersection of the plane and cylinder. In the preferred embodiment, distal ends of the spokes trace similar circles, but in different planes.

Sails 16 are connected between parts of the wheel 30 and 50 so that define the big circle 46 and the little circle 64. In the embodiment shown, connection of a sail 16 is made to the big wheel 30 upon one of the big masts 42 and to the little wheel 50 upon one of the little masts 60.

Each sail 16 has at least two parallel sides and when connected to the motor 10, one of the parallel sides is fastened along a length of a big mast 42 and the other of the two parallel sides is fastened along a length of a little mast 60.

Preferably, the sail 16 is rectangular in shape with a length shorter than a length of the little mast 60. The width of each sail 16, where said width is measured perpendicular to the length of said sail 16, is sufficient to span the greatest distance between the big circle 46 and the little circle 64 during operation of the motor 10.

The sails 16 are constructed from a sturdy flexible material. The material should be impervious enough to a fluid in which it is operating to offer resistance to said fluid while also being flexible enough to fold upon itself. For motors used in wind currents, an ideal sail 16 construction material would be similar to that used for parachutes.

Each sail 16 is fastened to the wheels 30 and 50 between a pair of masts comprising one big mast 42 and one little mast 60 by sail fasteners 18. The sail fasteners 18 are located along the length of the sail 16 where said sail 16 is connected to the masts 42 and 60. Each fastener 18 is about one to one and one-half feet long and tubular. Adjacent fasteners are proximate to each other and may abut, end-to-end.

The sail fasteners 18 are constructed from tubular piping where said piping is made from a resilient material that resumes its original shape after being deformed. Possible construction materials include flex steel, fiberglass, and plastics. The interior of the sail fastener 18 is similar in shape and just smaller than the exterior of masts 42 and 60. Each fastener 18 has a split 20 completely through a side of said fastener 18 and extending along a length of said fastener 18.

The split 20 allows the fastener 18 to be spread and placed about one of the masts 42 or 60 with the sail 16 between said fastener 18 and the mast. The fastener 18 is then allowed to snap back into its original shape about the sail 16 and respective mast. In this manner, the sail 16 is clamped to the masts 42 and 60 upon which said sail 16 is being mounted. The fastener 18 is flexible to an extent that allows the side of said fastener 18 to be spread apart at the split 20 for a distance greater than a diameter of the masts. Furthermore, the fastener 18 has sufficient rigidity to cause said fastener 18 to snap back about the sail 16 and mast when released.

In the preferred embodiment of the motor 10, the spokes 38, 40, 56, and 58 are constructed from round tubular steel, as are the masts 42 and 60. The tubular steel used for the construction of the previously mentioned components is similar with respect to thickness of the steel as well as diameter of the pipe.

The tubular steel from which the crank 80 is constructed has a greater thickness in the tubing's wall as well as having a larger diameter.

OPERATON OF THE MOTOR

The motor 10 must be located at a place where fluid currents commonly occur. This will typically be a location that has consistent winds.

The minor axis 12 is positioned a horizontal distance away from the major axis 11 and parallel thereto. The crank 80 is rotatably connected to the base 13 so that when rotated the minor axis 12 revolves around the major axis 11 at a radius equal to a horizontal length of the extensions 88 and 90.

In order for the motor 10 to most efficiently harness a maximum amount of energy from a wind, the crank 80 is positioned so that offset line 14 forms about a 45 degree angle with a wind or current directional line 15 that traces the direction from which the wind is blowing and also intersects the major axis 11. The offset line 14 intersects and is perpendicular to the major and minor axes 11 and 12. Whether the minor axis 12 is located to the right or the left of the wind directional line 15 determines the direction of rotation for the motor 10. If the minor axis 12 is located to the left of the wind directional line 15 when facing the wind, then the motor 10 rotates clockwise. Conversely, if the minor axis 12 is located to the right of the line 15, then the motor 10 rotates counterclockwise.

Referring to FIG. 4, a top plan view of the wheels 30 and 50 together with the crank 80 may be seen. In the embodiment shown, the minor axis 12 is oriented to the left of the wind directional line 15 causing clockwise rotation.

Referring to the cylindrical volumes defined by the rotating wheels 30 and 50 previously described, the little wheel 50 rotates completely within the cylinder defined by the big wheel 30. The perpendicular distance at which the minor axis 12 is offset from the major axis 11 is slightly shorter than the difference between the radius of the big circle 46 and the radius of the little circle 64.

Referring to the quadrants 1 through 4 of FIG. 4, an exterior of the circumference of the little circle 64 approaches very nearly an interior of the circumference of the big circle 46 at a point where a continuation of the offset line 14 away from the major axis 11 intersects said circles 64 and 46. This is illustrated in quadrant 4 of FIG. 4, the quadrant in which the minor axis 1.2 is positioned. On a continuation of the offset line 14 in a direction away from the minor axis 12, the circumference of the little circle 64 is farthest away from the circumference of the big circle 46. This is illustrated in quadrant 2 of FIG. 4.

As the motor 10 operates, each sail 16 experiences a cyclical opening and closing. Opening of the sail 16 is effected by moving the two parallel sides of said sail 16 by which said sail 16 is connected between the wheels 30 and 50 away from each other. The sail 16 is then closed by moving the two parallel sides closer together so that said sail 16 folds.

In the diagram of FIG. 4, the sail 16 is predominantly closed as said sail 16 passes into quadrant 4 because the masts 42 and 60 are close together. As the two wheels 30 and 50 continue to rotate and the sail 16 passes into quadrant 1 from quadrant 4, said sail 16 opens as the distance between the big circle 46 and the little circle 64 increases. As the sail 16 opens, a greater surface area of said sail 16 is presented to the wind thereby offering a increased resistance to the wind. The force of the wind is exerted upon the sail 16 and transferred from said sail 16 to the wheels 30 and 50 thereby causing each wheel to continue its rotation out of quadrant 1 into quadrant 2 where the circles 46 and 64 are farthest apart and therefore said sail 16 is at its greatest extension. The greatest energy is derived from the wind in quadrants 1 and 2 when the sail 16 is open and a surface of said sail 16 is most nearly perpendicular to the direction of the wind.

The sail 16 begins its return into the wind in quadrant 3 and likewise said sail 16 undergoes the folding process in quadrant 3 as the big circle 46 and little circle 64 become more closely oriented. Energy, however, is still derived from the wind in the third quadrant in spite of the fact that the sail 16 is moving into the wind. The reason for this continued derivation of power may be seen in the curvature of the sail 16 in quadrant 3. The wind is diverted by the sail 16 because of said sail's 16 curvature and said diverted wind tends to push the wheels 30 and 50 around in a clockwise manner. It is in quadrant 3 and 4 that the folding sail 16 offers least resistance to the wind into which said sail 16 is moving. The sail 16 flags or flaps in the current during a portion of said sail's 16 travel through quadrants 3 and 4.

A power phase or power stroke occurs over more than seventy-five percent of the motor's 10 revolution. This power stroke is illustrated in FIG. 4 as comprising the entirety of quadrants 1 and 2, a majority of quadrant 3 and a portion of quadrant 4. A sail 16 is considered to be within the power phase if the wind is exerting a force upon said sail 16 that tends to rotate the motor 10 in the desired direction. That is to say, the motor 10 harnesses the force of the wind and transfers said force to the motor 10 through the sails 16.

The movement of the wheels 30 and 50 is not synchronized. That is to say, each wheel is not always rotating at the same rotational speed. Like the cyclical opening and closing of the sails 16, there is also a cyclical pattern in which the big mast 42 to which a sail 16 is connected leads the corresponding little mast 60 to which the same sail 16 is fastened. In the following phase of rotation the little mast 60 then passes the big mast 42 and leads said mast 42 during the remainder of the revolution.

Beginning at about a midpoint of quadrant 4 the big mast 42 precedes the little mast 60 in rotation. The big mast 42 continues to lead to about a midpoint of quadrant 2 where the little mast 60 passes ahead of said big mast 42 and leads throughout th continuation of the rotation back to the midpoint of quadrant 4 where again said big mast 42 becomes the leader. The transition between leadership in quadrant 2 is smooth because the sail 16 is extended.

Figure 3:
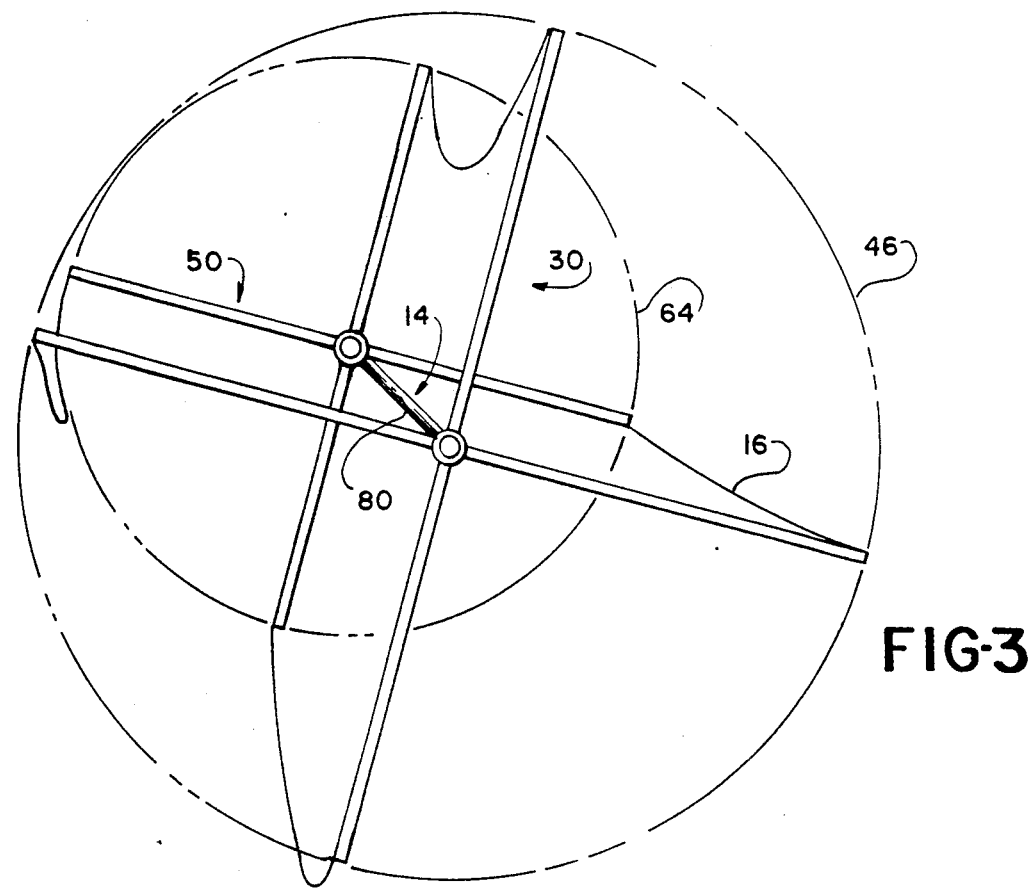
FIG. 3 is a top plan view of the fluid current motor.

The spokes holding the masts 42 and 60 between which a sail 16 is connected are directly above or below the other spokes when said spokes pass through a vertical plane containing the offset line 14. Furthermore, those aligned spokes of the two wheels remain parallel as illustrated in the top view of the motor 10 shown in FIG. 3.

Positioning of the offset line 14 with respect to the wind's direction is easily automated by attaching a wind vane to the motor 10. It is contemplated that a wind vane could be fixed to the crank 80 s that said wind vane automatically aligns itself with the wind's direction. A connection between the vane and crank 80 would cause the offset line 14 to be positioned at the preferred angle of about 45 degrees to the wind directional line 15.

The preferred embodiment of this invention has a built-in disabling mechanism through the use of the previously described sail fasteners 18. Each sail 16 is clamped to the masts 42 and 60 with sufficient force to retain said sail 16 upon the motor 10 in wind speeds that are within a safe operational range. The rigidity of the fasteners 18 is designed to allow the sails 16 to slip from the masts 42 and 60 in the event that the wind becomes strong enough to cause damage to the motor 10 if operation continued.

Energy may be derived from the motor 10 at the rotating components near the base 13. It is further contemplated that a power ring could be fixed to a lower portion of the motor 10 so that said power ring rests upon rotatable conversion devices fixed to the ground and stationary with respect to the motor 10.

In compliance with the statute, the invention has been described in language more or less specific as to structural features. It is to be understood, however, that the embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims, appropriately interpreted in accordance with the doctrine of equivalents.

I claim:

1. The method of converting fluid energy into mechanical energy in a process that includes the following steps:
    a. constructing a fluid current motor having a big wheel and a little wheel so that the little wheel rotates about a minor axis and the big wheel rotates about a major axis,
    b. locating the minor axis away from and parallel to the major axis at a perpendicular distance less than the difference between a radius of the big wheel and a radius of the little wheel,
    c. positioning the little wheel within the big wheel so that a circumference of a little circle defined by the rotating little wheel approaches a circumference of a big circle defined by the rotating big wheel in one phase of operation and departs in another phase,
    d. attaching at least two sails between the big wheel and the little wheel so that the sails are repetitively opened and closed; and
    orienting the motor so that an offset line that is perpendicular to and intersecting the major axis and minor axis creates about a forty-five degree angle with a fluid current directional line that traces a direction from which fluid current is coming and intersects said major axis.

2. The process defined in 1 further comprising:
    f. opening each sail during a power phase of operation when the circumferences of the circles are distanced, and
    g. closing each sail during a return phase of operation when the circumferences are nearer to each other.

3. The process defined in 1 further comprising:
    f. harnessing the force of the current for a power stroke in the open sail by
    g. presenting a greater surface area of the sail in opposition to the current,
    h. allowing the sail to be pushed by the current in said sail's open configuration,
    j. transferring the force derived from the current by the sail to the wheels thereby
    k. causing the wheels to rotate about the axes,
    l. bringing the open sail around on the wheels so that the sail folds upon itself as the wheels become closer together thereby
    m. causing the sail to be less resistant to the current in the folded configuration than in the open configuration, and
    n. moving the sail into the current so it is readied for another power stroke.

4. The process defined in 1 further comprising:
    f. diverting the current during a portion of the power stroke when the sail is moving into the current and thereby
    g. deriving power from the current.

5. The process defined in 1 further comprising:
    f. folding the sail over itself and about the masts during a portion of the return phase so that said sail assumes a chambered shape and continues to derive power from the current.

6. The process defined in 1 further comprising:
    f. wrapping parallel edges of each sail around one big mast and one little mast so that said sail spans the distance between said masts,
    g. spreading a split sail fastener so that an opening along said split is of sufficient width to allow the fastener to be placed about the mast with the portion of the sail wrapped about the mast between said mast and said fastener, and
    h. allowing the fastener to return to its original configuration so that the sail is secured between the fastener and the mast thereby
    j. fixing the sail to the mast.

7. A fluid current motor comprising:
    a. a base,
    b. a major axis parallel to a long axis of the base,
    c. a minor axis parallel to the major axis and offset a distance from said major axis,
    d. a big wheel rotatable about the major axis.
    e. the big wheel having at least two big spokes extending radially from the major axis so that distal ends of said spokes trace a big circle when said big wheel rotates,
    f. the big circle having a radius and a circumference and said circumference being centered about the major axis,
    g. a little wheel rotatable about the minor axis,
    h. the little wheel having at least two little spokes extending radially from the minor axis so that distal ends of said little spokes trace a little circle when said little wheel rotates,
    j. the little circle having a radius and a circumference and said circumference being centered about the minor axis,
    k. the little wheel is positioned within a cylinder defined by a rotated big wheel,
    l. at least two sails connected between the big wheel and the little wheel, m. a crank rotatably connected to the base,
n. the crank being bent so that a long axis of a mid-section of said crank is coincident with the minor axis and the major axis is coincident with a long axis of a top end of said crank and a long axis of a bottom end of said crank,
o. the radius of the little circle being less than the radius of the big circle, and
p. a perpendicular distance between the minor axis and the major axis is less than the difference between lengths of the radius of the big circle and the radius of the little circle.

8. The invention as defined in claim 7 further comprising
q. the perpendicular distance between the major axis and the minor axis is not shorter than one foot less than the difference between the lengths of the radius of the big circle and the radius of the little circle.

9. The invention as defined in claim 7 further comprising:
q. the crank having:
  i. the top end connected to
  ii. a top extension by
  iii. a topp bend,
  iv. the top extension connected to
  v. the mid-section by a
  vi. second bend,
  vii. the mid-section connected to
  viii. a bottom extension by
  ix. a third bend,
  x. the bottom extension connected to
  xi. the bottom end by
  xii. a bottom bend, and
  xiii. the top extension and the bottom extension radially oriented away from the major axis thereby positioning the mid-section away from the major axis,
r. the bottom end of the crank being rotatingly connected to the base, and
s. the top end of the crank being rotatingly connected to a top anchor.

10. The invention as defined in claim 7 further comprising:
q. the minor axis being revolvable about the major axis.

11. The invention as defined in claim 7 further comprising:
q. the big wheel having:
  i. a big top hub
  ii. at least two big masts and
  iii. a big bottom hub,
r. the big top hub concentric about the major axis and rotatably connected about a top end of a crank,
s. ech of at least one big upper spoke extending radially from the big top hub and all of said spokes are equiangularly spaced about said hub,
t. the big bottom hub concentric about the major axis and rotatably connected about a bottom end of the crank,
u. each of at least one big lower spoke extending radially from the big bottom hub and all of said spokes are equiangularly spaced about said hub,
v. each big mast oriented so that a long axis of said big mast is parallel to the major axis and intersects the circumference of the big circle,
w. the little wheel having:
  i. a little top hub
  ii. at least two little masts and
  iii. a little bottom hub,
x. the little top hub concentric about the minor axis and rotatably connected to a top end of a mid-section of the crank,
y. each of at least one little upper spoke extending radially from the little top hub and all of said spokes are equiangularly spaced about said hub,
z. the little bottom hub concentric about the minor axis and rotatably connected to a bottom end of the mid-section,
aa. each of at leastone little lower spoke extending radially from the little bottom hub and all of said spokes are equiangularly spaced about said hub,
bb. each little mast oriented so that a long axis of said mast is parallel to the minor axis and intersects the circumference of the little circle, and
cc. an angular distance between adjacent big spokes on a hub is equal to an angular distance between adjacent little spokes on a hub.

12. The invention as defined in claim 7 further comprising:
q. each sail having two parallel sides, and
r. one of the two parallel sides of each sail being attached to the big wheel at the circumference of the big circle and the other of the two parallel sides being attached to the little wheel at the circumference of the little circle.

13. The invention as defined in claim 7 further comprising:
q. the big wheel includes at least two big masts located radially about the major axis,
r. each big mast is oriented so that a long axis of said mast is parallel to the major axis and intersects the circumference of the big circle,
s. the little wheel includes at least two little masts located radially about the minor axis,
t. each little mast is oriented so that a long axis of said mast is parallel to the minor axis and intersects the circumference of the little circle, and
u. one sail connected between a pair of masts comprising one big mast and one little mast.

14. The invention as defined in claim 7 further comprising:
q. one of the two parallel sides of each sail being attached to a big mast along a length of said big mast and the other of the two parallel sides being attached to a little mast along a length of said little mast.

15. A fluid current motor comprising:
a. a base,
b. a major axis parallel to a long axis of the base,
c. a minor axis parallel to the major axis and offset a distance from said major axis,
d. a big wheel rotatable about the major axis,
e. the big wheel having at least two big spokes extending radially from the major axis so that distal ends of said spokes trace a big circle when said big wheel rotates,
f. the big circle having a radius and a circumference and said circumference being centered about the major axis,
g. a little wheel rotatable about the minor axis,
h. the little wheel having at least two little spokes extending radially from the minor axis so that distal ends of said little spokes trace a little circle when said little wheel rotates, j. the little circle having a radius and a circumference and said circumference being centered about the minor axis,
k. the little wheel is positioned within a cylinder defined by a rotated big wheel,
l. at least two sails connected between the big wheel and the little wheel;
m. the big wheel having:
  i. a big top hub
  ii. at least two big masts and
  iii. a big bottom hub,
n. the big top hub concentric about the major axis and rotatably connected about a top end of a crank,
o. each of at least one big upper spoke extending radially from the big top hub and all of said spokes are equiangularly spaced about said hub,
p. the big bottom hub concentric about the major axis and rotatably connected about a bottom end of the crank,
q. each of at least one big lower spoke extending radially from the big bottom hub and all of said spokes are equiangularly spaced about said hub,
r. each big mast oriented so that a long axis of said big mast is parallel to the major axis and intersects the circumference of the big circle,
s. the little wheel having:
  i. a little top hub
  ii. at least two little masts and
  iii. a little bottom hub,
t. the little top hub concentric about the minor axis and rotatably connected to a top end of a mid-section of the crank,
u. each of at least one little upper spoke extending radially from the little top hub and all of said spokes are equiangularly spaced about said hub,
v. the little bottom hub concentric about the minor axis and rotatably connected to a bottom end of the mid-section,
w. each of at least one little lower spoke extending radially from the little bottom hub and all of said spokes are equiangularly spaced about said hub,
x. each little mast oriented so that a long axis of said mast is parallel to the minor axis and intersects the circumference of the little circle, and
y. an angular distance between adjacent big spokes on a hub is equal to an angular distance between adjacent little spokes on a hub.

* * * * *